United States Patent
Wada

(10) Patent No.: US 8,041,191 B2
(45) Date of Patent: Oct. 18, 2011

(54) IMAGE PLAYBACK APPARATUS AND PLAYBACK METHOD

(75) Inventor: Katsuhiro Wada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1510 days.

(21) Appl. No.: 11/479,478

(22) Filed: Jun. 30, 2006

(65) Prior Publication Data

US 2007/0019928 A1    Jan. 25, 2007

(30) Foreign Application Priority Data

Jul. 22, 2005   (JP) ................................. 2005-212744

(51) Int. Cl.
*H04N 5/78* (2006.01)
(52) U.S. Cl. .......................... 386/314; 386/323; 386/324
(58) Field of Classification Search .................. 386/314, 386/323, 324
See application file for complete search history.

(56) References Cited

U.S. PATENT DOCUMENTS

2004/0022519 A1* 2/2004 Lee ................................. 386/52
2006/0045493 A1* 3/2006 Ohashi et al. .................. 386/124

FOREIGN PATENT DOCUMENTS

JP   2001-275077   10/2001

* cited by examiner

*Primary Examiner* — Thai Tran
*Assistant Examiner* — Girumsew Wendmagegn
(74) *Attorney, Agent, or Firm* — Cowan, Liebowitz & Latman, P.C.

(57) ABSTRACT

When the recording format of an image recorded on a magnetic tape (709) is changed, a playback time period of an image signal by a REC review function is extended. Even when the recording format is changed during playback of an image signal by the REC review function, an image (409) recorded in the recording format after change can be displayed after a blue-backed screen (408) is displayed. Therefore, the user can determine whether the blue-backed screen (408) is displayed due to switching of the system or due to an unrecorded part of an image signal. Hence, the user can be prevented from overwriting a new image signal on the recorded region of an image signal by mistake.

6 Claims, 7 Drawing Sheets

IMAGE PLAYBACK APPARATUS AND PLAYBACK METHOD

FIELD OF THE INVENTION

The present invention relates to a playback apparatus, a playback method, and a computer program and, more particularly, to a technique suited to be used to play back image signals having different recording formats.

BACKGROUND OF THE INVENTION

Conventionally, a digital VTR which records an image signal on a magnetic tape as digital data is known. In recent years, a digital VTR which can record and play back a high-definition (HD) image in place of a conventional standard-definition (SD) image has been proposed (for example, see Japanese Patent Laid-Open No. 2001-275077). In such a digital VTR, a high-definition image signal obtained by photography is encoded by MPEG and is then recorded on a magnetic tape.

As the standard for consumer digital VTRs that record SD image signals, a DV format has been proposed. Furthermore, as the standard for consumer digital VTRs that record HD image signals, an HDV format (Hi-Vision format) has been proposed.

In this HDV format, the same magnetic tape as the DV format is used as a recording medium and an MPEG-encoded HD image signal is recorded and played back.

As a function of a video camera, a REC review function is known. In this function, after recording is paused, a tape is rewound by a predetermined amount, and playback is made up to the paused position.

As described above, the HDV format uses the same magnetic tape as in the DV format. Hence, a video camera which supports both the DV and HDV formats is available.

In such a video camera, an SD image signal recorded in the DV format and an HD image signal recorded in the HDV format can coexist on a single magnetic tape. For this reason, upon playback, the playback method of an image signal must be switched at a boundary between the recorded region in the DV format and that in the HDV format. As a result, output of a playback image may cease.

For example, when the boundary between the recorded region in the DV format and that in the HDV format is included in a zone to be played back by the aforementioned REC review function, the processing method must be switched at that boundary, and as a result an image ceases to be played back. Therefore, although an image signal is actually recorded on the magnetic tape, the user may misunderstand and believe that no signal is recorded.

As a result, when the user starts recording from the position where an image ceases to be played back, the originally recorded image may be overwritten and erased.

SUMMARY OF THE INVENTION

The present invention has been made in consideration of the above problems, and has as its object to prevent a new image signal from being inadvertently overwritten on a region where an image signal has already been recorded.

According to an aspect of the present invention, there is provided a playback apparatus comprising: playback adapted to play back image signals recorded in a plurality of different recording formats from a recording medium; recording review execution unit adapted to control, in response to issuance of a recording review instruction for an image signal recorded on the recording medium, the playback unit to rewind the recording medium from a position upon issuance of the recording review instruction by a predetermined amount and to play back the image signal from the recording medium for a period based on the predetermined amount from the rewound position; and detection unit adapted to detect a change in recording format of the image signal played back by the playback unit in accordance with the recording review instruction, wherein when the detection unit detects the change in recording format of the image signal, the recording review execution unit controls to execute a playback operation of the image signal for a longer period than the period based on the predetermined amount.

According to another aspect of the present invention, there is provided a playback method for playing back an image signal using playback unit adapted to play back image signals recorded in a plurality of different recording formats from a recording medium, comprising: a recording review execution step of controlling, in response to issuance of a recording review instruction for an image signal recorded on the recording medium, the playback unit to rewind the recording medium from a position upon issuance of the recording review instruction by a predetermined amount and to play back the image signal from the recording medium for a period based on the predetermined amount from the rewound position; and a detection step of detecting a change in recording format of the image signal played back by the playback unit in accordance with the recording review instruction, wherein the recording review execution step includes controlling, when the change in recording format of the image signal is detected in the detection step, to execute a playback operation of the image signal for a longer period than the period based on the predetermined amount.

According to a further aspect of the present invention, there is provided a computer program for making a computer execute a step of playing back an image signal using playback unit adapted to play back image signals recorded in a plurality of different recording formats from a recording medium, the program characterized by making the computer execute: a recording review execution step of controlling, in response to issuance of a recording review instruction for an image signal recorded on the recording medium, the playback unit to rewind the recording medium from a position upon issuance of the recording review instruction by a predetermined amount and to play back the image signal from the recording medium for a period based on the predetermined amount from the rewound position; and a detection step of detecting a change in recording format of the image signal played back by the playback unit in accordance with the recording review instruction, wherein the recording review execution step includes controlling, when the change in recording format of the image signal is detected in the detection step, to execute a playback operation of the image signal for a longer period than the period based on the predetermined amount.

With this arrangement, according to the present invention, a new image signal can be prevented from being overwritten on a recorded region of an image signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
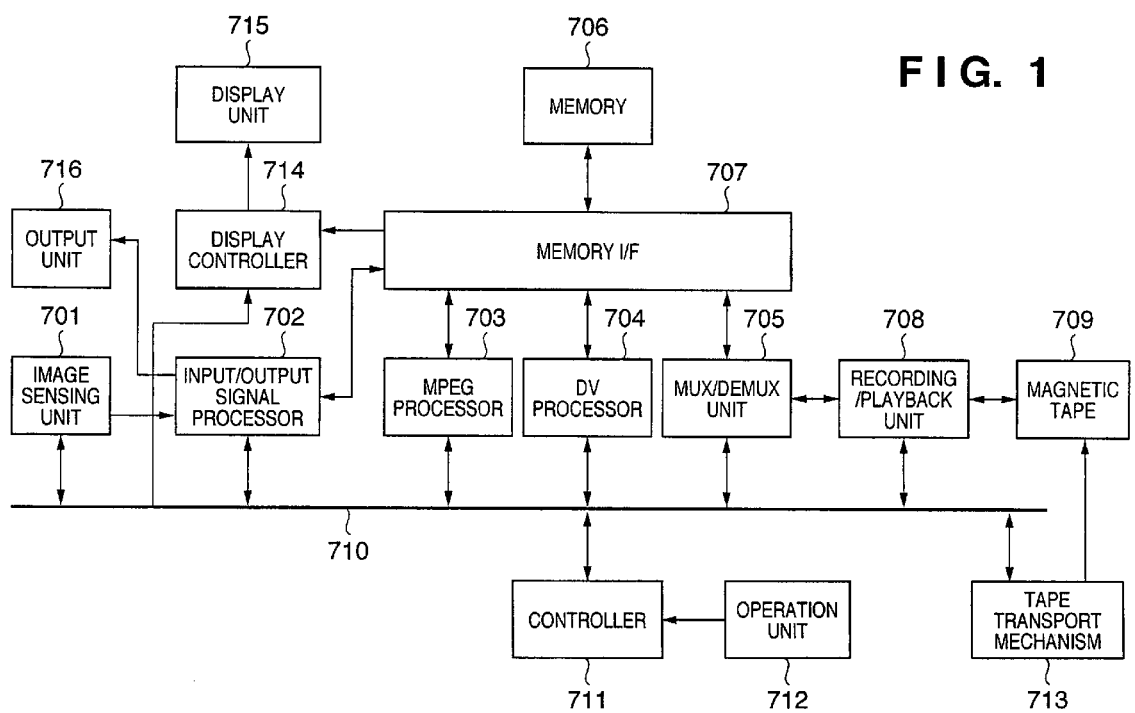
FIG. 1 is a block diagram showing an example of the arrangement of a digital video camera as an embodiment of a playback apparatus according to the present invention.

FIG. 1 is a block diagram showing an example of the arrangement of a digital video camera (DVC) as an embodiment of a playback apparatus according to the present invention.

The video camera shown in FIG. 1 can record and play back an SD image signal in the DV format and an HD image signal in the HDV format. The user can arbitrarily switch between the DV format and the HDV format upon recording by operating an operation unit 712.

Referring to FIG. 1, an image sensing unit 701 is used to photograph an object, and outputs an SD or HD image signal. An input/output signal processor 702 applies known signal processing to the image signal output from the image sensing unit 701, and outputs the image signal that has undergone the signal processing to a memory I/F 707. Furthermore, the input/output signal processor 702 converts an image signal read out via the memory I/F 707 to a format suited to output in a playback mode.

An MPEG processor 703 encodes and decodes an HD image signal by MPEG. A DV processor 704 encodes and decodes an SD image signal according to an intra-frame encoding method specified in the DV format. A mux/demux unit 705 appends additional information including a sync signal and other data to image data output via the memory I/F 707 in a recording mode. Furthermore, the mux/demux unit 705 detects image data, additional information, and the like from data to be played back, and outputs them to the memory I/F 707 or a controller 711 in the playback mode.

A memory 706 is a large-capacity recording medium such as an SDRAM or the like. The memory I/F 707 controls read and write accesses of data between respective units and the memory 706.

A recording/playback unit 708 records data in the DV or HDV format on a magnetic tape 709. Furthermore, the recording/playback unit 708 plays back data in the DV or HDV format recorded on the magnetic tape 709.

The controller 711 is used to control the processing of the digital video camera, and comprises, e.g., a CPU, ROM, and RAM. The ROM stores a program required to execute processing of this embodiment. The CPU executes the program stored in the ROM. The RAM serves as a work area used when the CPU executes the program stored in the ROM, and temporarily stores data.

The operation unit 712 has various switches such as a recording/playback trigger switch, REC review instruction switch, and the like. A tape transport mechanism 713 has a capstan motor, capstans, and the like, and transports the magnetic tape 709. A display controller 714 generates data to be displayed on a display screen of a display unit 715 and outputs it to the display unit 715 in accordance with an image signal from the memory I/F 707 and an instruction from the controller 711. The display unit 715 is, for example, a liquid crystal display device. An output unit 716 externally outputs playback image data.

Note that the image sensing unit 701, input/output signal processor 702, MPEG processor 703, DV processor 704, mux/demux unit 705, recording/playback unit 708, controller 711, tape transport mechanism 713, and display controller 714 are connected to a control bus 710. These units can communicate with each other via the control bus 710.

In the digital video camera shown in FIG. 1, the memory 706 is commonly used by the respective units, and read and write accesses to the memory 706 are arbitrated by the memory I/F 707.

As described above, the user can select one of recording formats, i.e., the DV and HDV formats by operating the operation unit 712 upon recording. The controller 711 controls the memory I/F 707 in accordance with the recording format of user's choice to change address mapping on the memory 706 to a format suited to the recording format of user's choice.

When the user selects the DV format, the controller 711 controls the image sensing unit 701 to output an SD image. Also, the controller 711 controls the DV processor 704 to encode the sensed image. On the other hand, when the user selects the HDV format, the controller 711 controls the image sensing unit 701 to output an HD image. Also, the controller 711 controls the MPEG processor 703 to encode the photographed image.

In this manner, on the magnetic tape 709 as the recording medium, an image signal recorded in the DV format and that recorded in the HDV format can be mixed and recorded.

When the recorded image signal is read out from the magnetic tape 709 and is played back, the mux/demux unit 705 discriminates based on identification information in the readout signal if that signal was recorded in the DV or HDV format. The mux/demux unit 705 notifies the controller 711 of the discriminated recording format.

The controller 711 changes address mapping on the memory 706 according to the recording format notified by the mux/demux unit 705. The controller 711 controls one of the MPEG processor 703 and DV processor 704 to decode the image signal according to the notified recording format. The controller 711 controls the display controller 714 to read out the decoded image signal via the memory I/F 707, and to display it on the display unit 715.

When the recording format of an image signal is changed during read-out of the image signal, the controller 711 controls the tape transport mechanism 713 to continue transporting of the magnetic tape 709 intact. Furthermore, the controller 711 controls the mux/demux unit 705 to stop a data write access to the memory I/F 707. The controller 711 changes address mapping on the memory 706 via the memory I/F 707. Upon completion of change of address mapping, the controller 711 controls the mux/demux unit 705 to restart the data write access to the memory I/F 707.

A REC review function will be described below.

When the user operates a REC review switch of the operation unit 712 while he or she pauses the recording operation, the controller 711 controls the tape transport mechanism 713 to execute REC review processing as follows.

Figure 2:
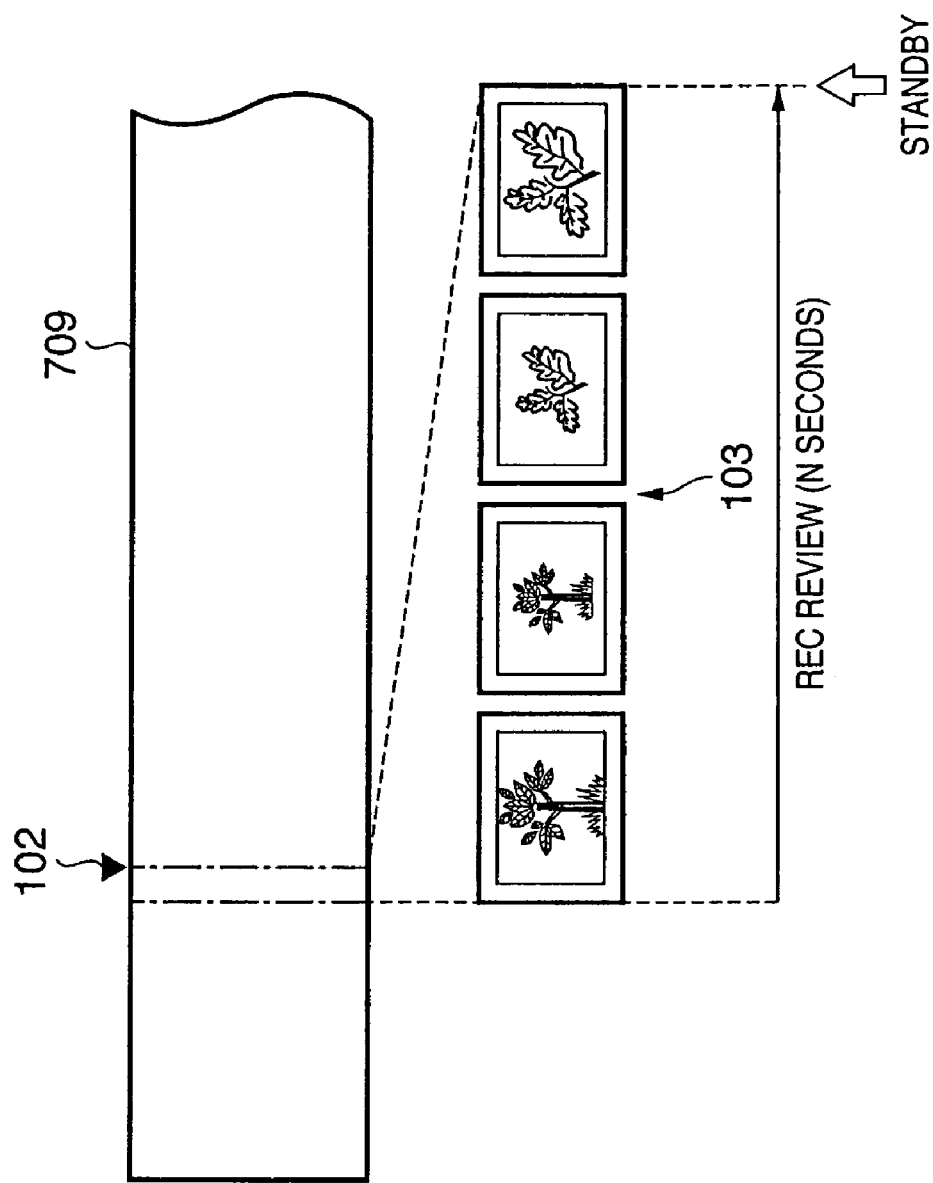
FIG. 2 is a conceptual view showing an example of information recorded on a magnetic tape and an image to be displayed upon execution of a REC review function when different recording formats are not mixed.

FIG. 2 is a conceptual view showing information recorded on the magnetic tape 709 and an image to be displayed upon execution of the REC review function.

FIG. 2 shows a case wherein data is recorded in only one recording format of the DV format and HDV format.

For example, when the user newly sets a magnetic tape 709 on which an image signal has already been recorded in the video camera, and is about to start recording, he or she may want to confirm if the recording start position poses no problem. In this case, the user can confirm if the current tape position poses no problem as the recording start position by using the REC review function at the current tape position.

When the REC review function is executed, the controller 711 controls the tape transport mechanism 713 to rewind the magnetic tape 709 from a tape stop position (full inverted-triangle mark in FIG. 2) 102 shown in FIG. 2 by an amount corresponding to a predetermined time period. After that, the controller 711 controls the recording/playback unit 708 to play back an image signal recorded on the magnetic tape 709 for the predetermined time period (N seconds). The controller 711 then controls the display controller 714 to display a playback image 103 based on the played-back image signal on the display unit 715. After that, when playback of the image signal to the tape stop position 102 ends, a standby state (recording paused state) is set.

The user confirms the recorded contents of the magnetic tape 709 by viewing the playback image 103 displayed on the display unit 715 and can determine if no problem is posed if he or she starts photography from the current position. If no problem is posed, the user inputs a photography start instruction to the digital video camera in the standby state, thus starting photography and recording.

That is, upon starting joint recording from a scene recorded at the tape stop position 102 of the magnetic tape 709, the user confirms the recorded contents of the magnetic tape 709 using the aforementioned REC review function. Then, the user can determine if he or she can start recording from the current position of the magnetic tape 709. Furthermore, by using the REC review function, the user can determine whether or not the magnetic tape 709 currently set in the digital video camera can be used in recording.

Figure 3:
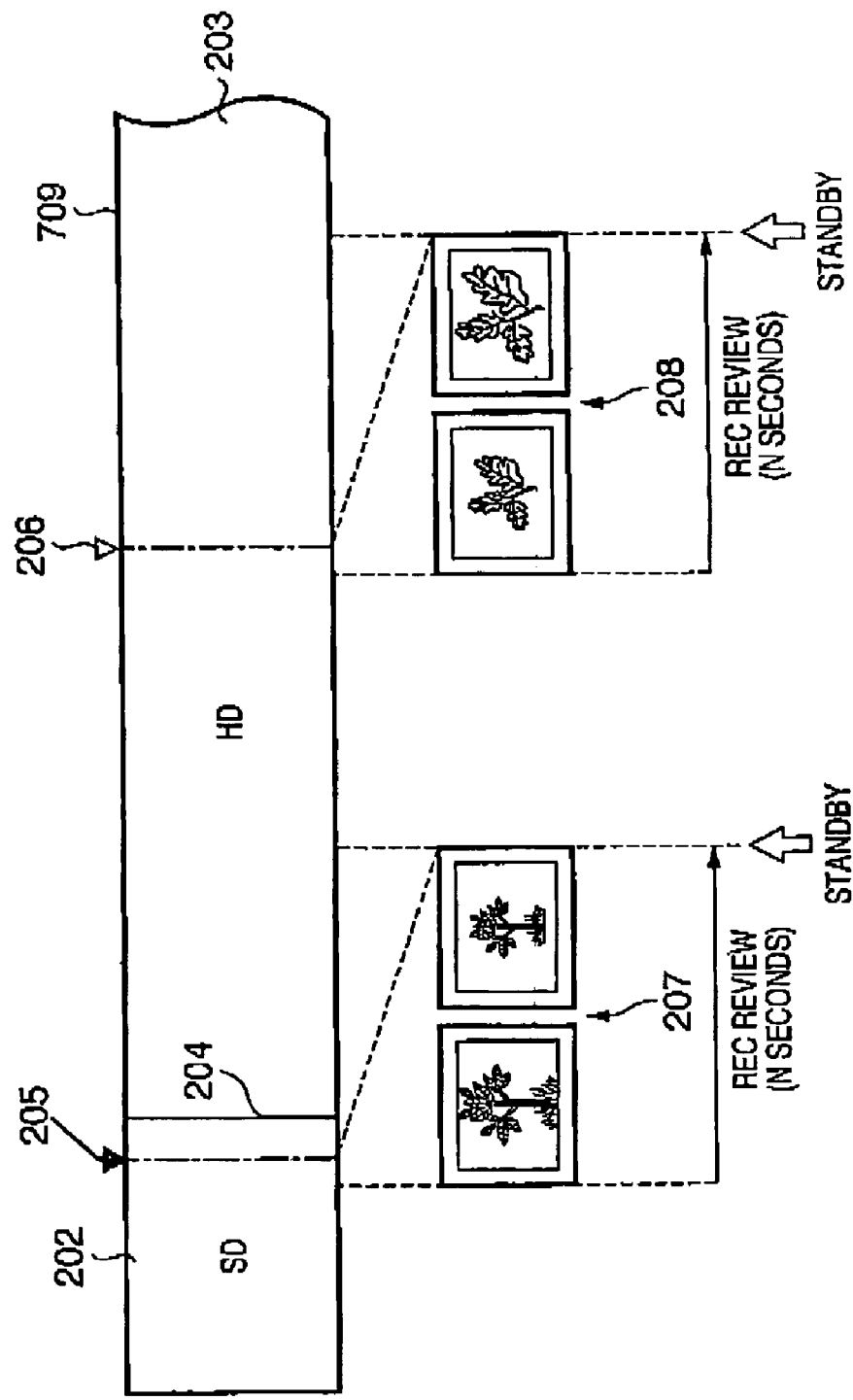
FIG. 3 is a conceptual view showing an example of information recorded on a magnetic tape and an image to be displayed upon execution of the REC review function when the recording formats are not changed during REC review although the different recording formats are mixed.

FIG. 3 is a conceptual view showing an example of information recorded on the magnetic tape 709 and an image to be displayed upon execution of the REC review function. FIG. 3 shows a case wherein an image recorded in the DV format and that recorded in the HDV format are mixed on the magnetic tape 709.

Referring to FIG. 3, a region 202 (SD in FIG. 3) recorded in the DV format and a region 203 (HD in FIG. 3) recorded in the HDV format are mixed on the magnetic tape 709.

Assume that a tape stop position 205 (full inverted-triangle mark in FIG. 3) is located within the region (DV format region) 202 recorded in the DV format. In this case, upon reception of an execution instruction of the REC review function, the controller 711 controls the tape transport mechanism 713 to rewind the magnetic tape 709 from the tape stop position 205 for a predetermined time period (N seconds). After that, the controller 711 controls the recording/playback unit 708 to play back an image signal recorded in the DV format for the predetermined time period (N seconds). The controller 711 then controls the display controller 714 to display a playback image 207 based on the played-back image signal on the display unit 715.

Also, assume that a tape stop position 206 (open inverted-triangle mark in FIG. 3) is located within the region (HDV format region) 203 recorded in the HDV format. In this case, upon reception of an execution instruction of the REC review function, the controller 711 controls the tape transport mechanism 713 to rewind the magnetic tape 709 from the tape stop position 205 for a predetermined time period. After that, the controller 711 controls the recording/playback unit 708 to play back an image signal recorded in the HDV format for the predetermined time period (N seconds). The controller 711 then controls the display controller 714 to display a playback image 208 based on the played-back image signal on the display unit 715.

Assume that the execution instruction of the REC review function is input when the tape stop position is located near a boundary 204 with the DV format region 202 within the HDV format region 203. In this case, the controller 711 controls the recording/playback unit 708 to play back and display image signals recorded in both the DV format region 202 and HDV format region 203 from the magnetic tape 709 during single execution of the REC review function.

Figure 4:
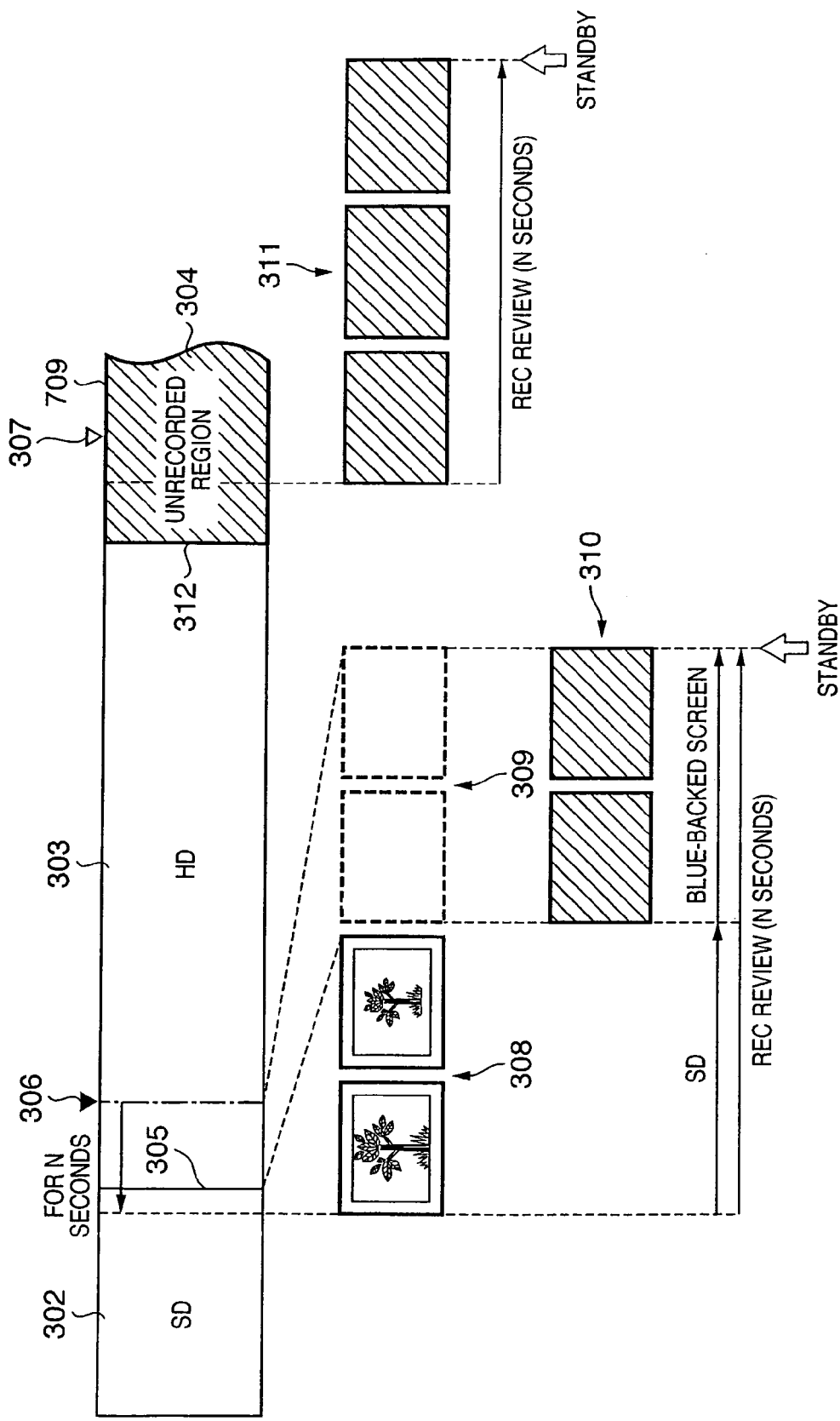
FIG. 4 is a view for explaining problems that may be posed when the recording formats are changed during REC review.

FIG. 4 is a conceptual view showing an example of information recorded on the magnetic tape 709 and an image to be displayed upon execution of the REC review function. As in FIG. 3, FIG. 4 shows a case wherein a DV format region 302 (SD in FIG. 4) and an HDV format region 303 (HD in FIG. 4) are mixed on the magnetic tape 709. In FIG. 4, a tape stop position 306 is located near a boundary 305 with the DV format region 302 within the HDV format region 303. A problem posed when the execution instruction of the REC review function is input in such situation will be described below with reference to FIG. 4.

When image signals recorded in different formats are to be played back, the internal processing of the digital video camera needs to be switched to a method suited to each individual recording format upon switching of the recording formats. However, this switching cannot be done instantly but it requires certain time.

Since a readout image signal cannot be normally processed during switching of the internal processing, for example, a blue-backed screen 310 may be displayed in place of an image on the display unit 715, as shown in FIG. 4.

For example, assume that the execution instruction of the REC review function is input at the tape stop position 306 (full inverted-triangle mark in FIG. 4). In this case, the magnetic tape 709 is rewound from the tape stop position 306 for N seconds, and playback is started. Since the playback start position is located within the DV format region 302, a playback image 308 by the internal processing corresponding to the DV format is displayed on the display unit 715. When the recording format of the magnetic tape 709 is switched from the DV format to the HDV format from the boundary 305, the internal processing must also be switched in correspondence with the HDV format.

The blue-backed screen 310 is displayed on the display unit 715 during switching of the internal processing. If switching is completed within the predetermined time period (N seconds) after the beginning of playback by the REC review function, an image signal 309 based on the image signal recorded in the HDV format can be displayed on the display unit 715 after display of the blue-backed screen 310.

However, if switching of the internal processing is not completed before the end of playback by the REC review function, the playback operation of the image signal by the REC review function ends while the blue-backed screen 310 is displayed.

In general, when a region where no image signal is recorded is played back, a blue-backed screen is also displayed. For example, when a tape stop position (open inverted triangle mark in FIG. 4) 307 is located within an unrecorded region 304 of an image signal, if the execution instruction of the REC review function is input, a blue-backed screen 311 is displayed after an end position 312 of the HDV format region 303.

In such situation, it is very difficult to discriminate whether the blue-backed screen is displayed due to the beginning of a region in the different recording format (blue-backed screen 310) or due to the beginning of an unrecorded part of an image signal (blue-backed screen 311).

As a result, the user may mistake the blue-backed screen 310 due to the beginning of the region in the different recording format for the blue-backed screen 311 due to the beginning of the "unrecorded part of an image signal". When such misunderstanding occurs, the user may overwrite an image signal on the already recorded region (e.g., the HDV format region 303 in FIG. 3).

In order to avoid such situation, according to this embodiment, when a zone in which playback is made by the REC review function (to be referred to as a REC review zone hereinafter) includes a plurality of different format regions, the REC review operation is controlled as follows.

That is, When the REC review zone includes regions of different recording formats, the controller 711 changes a playback time period of an image signal by the REC review function. In other words, the controller 711 dynamically varies the REC review zone. More specifically, the controller 711 changes the playback time period so that the REC review function ends with display of an image in place of the blue-backed screen. With this control, the user can clearly identify the blue-backed screens 310 and 311, and can be avoided from overwriting data on the already recorded region while mistaking for an unrecorded region.

Figure 5:
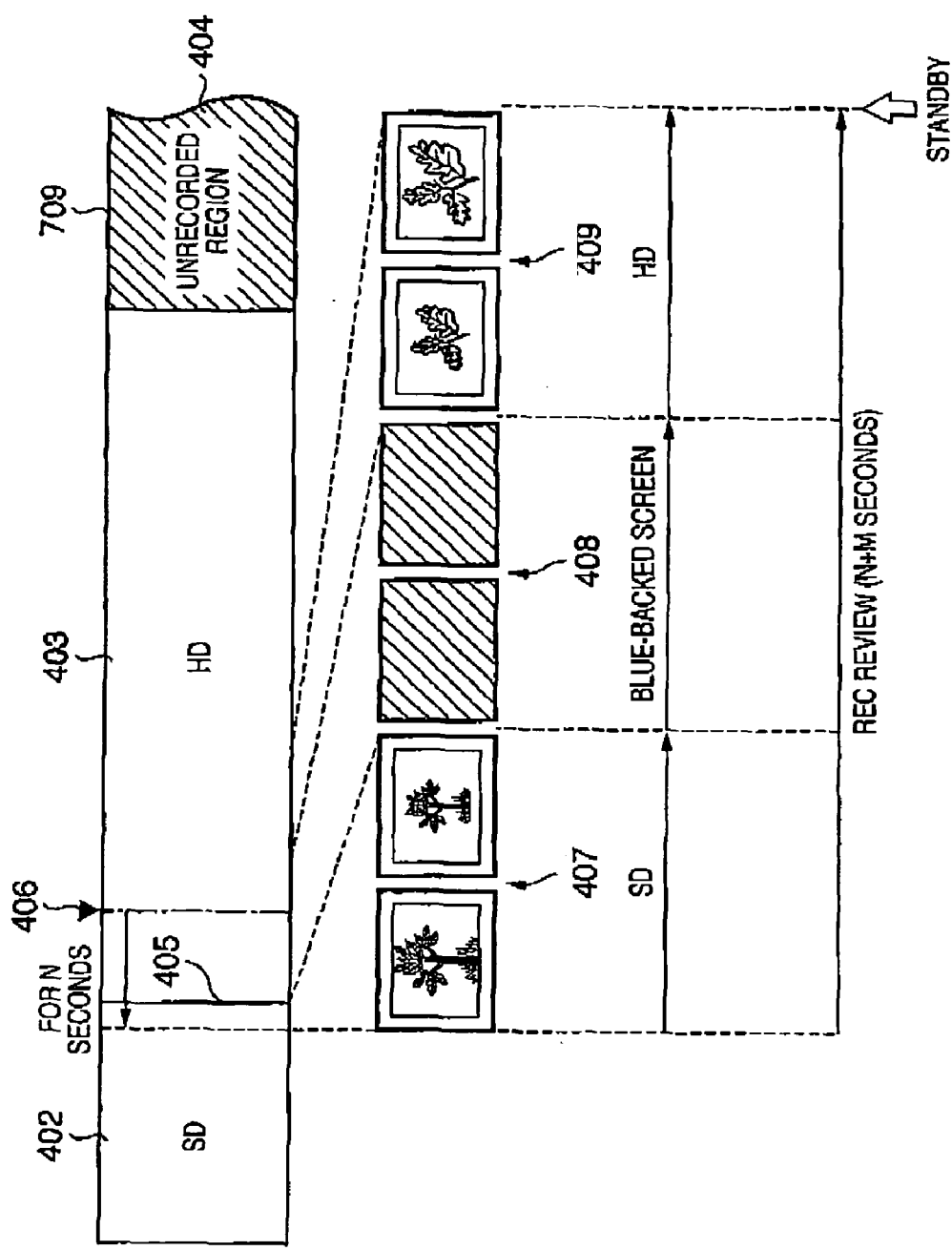
FIG. 5 is a view for explaining the REC review operation and display image of the digital video camera according to the first embodiment of the present invention.

FIG. 5 is a conceptual view showing an example of information recorded on the magnetic tape 709 and an image to be displayed upon execution of the REC review function. As in FIG. 4, FIG. 5 shows a case wherein a DV format region 402 (SD in FIG. 5), an HDV format region 403 (HD in FIG. 5), and an unrecorded region 404 of an image signal are mixed on the magnetic tape 709.

FIG. 5 shows an example of a method of solving the problem described using FIG. 4.

As shown in FIG. 5, assume that, for example, a predetermined time period for playing back an image signal by executing the REC review function is set to be N seconds. When a change in recording format is detected during the REC review zone, the duration of the REC review zone is extended to (N+M) seconds.

Referring to FIG. 5, assume that the execution instruction of the REC review function is issued at a tape stop position 406 (full inverted-triangle mark in FIG. 5). In this case, the controller 711 controls the tape transport mechanism 713 to rewind the magnetic tape 709 from the tape stop position 406 for N seconds. The controller 711 then controls the recording/playback unit 708 to start playback. Since the playback start position is located within the DV format region 402, the controller 711 controls the recording/playback unit 708 and DV processor 704 to display a playback image 407 based on the image signal recorded in the DV format on the display unit 715.

When the playback image 407 based on the image signal recorded in the DV format is kept displayed on the display unit 715, the position of the magnetic tape 709 moves to a boundary 405 between the regions 402 and 403 of different recording formats. Based on information from the mux/demux unit 705, the controller 711 detects the beginning of the HDV format region 403. The controller 711 changes the playback time period by the REC review function from N seconds to (N+M) seconds. That is, the controller 711 extends the REC review zone. At this time, the value M is set so that M seconds become longer than a time period required to switch from the DV format to the HDV format.

The controller 711 starts switching of the internal processing, and controls the display controller 714 to start display of a blue-backed screen 408 on the display unit 715. Upon completion of switching, the controller 711 controls to start display of a playback image 409 based on the image signal in the HDV format region 403 and to stop the magnetic tape 709 after an elapse of (N+M) seconds from the beginning of playback. With this control, the user can view an image of the HDV format region 403, and can recognize that the tape stop position 406 is not located within an unrecorded region.

As described above, according to this embodiment, the playback time period of an image signal by the REC review function is extended according to the recording format of an image recorded on the magnetic tape 709. Even when the recording format is changed during playback of an image signal by the REC review function, the playback image 409 based on the signal recorded in the recording format after change can be displayed on the display unit 715 after the blue-backed screen 408 is displayed.

In this way, even when the boundary 405 between the regions recorded in different recording formats is located within the REC review zone, the contents recorded on the magnetic tape 709 can be displayed on the display unit 715 during REC review.

Since the image 409 recorded in the recording format after change can be displayed by extending the playback time period of an image signal by the REC review function, the REC review of the recorded region never ends with display of a blue-backed screen. For this reason, the user can determine whether a blue-backed screen is displayed owing to switching of the internal processing of the apparatus or owing to an unrecorded part of an image signal upon playing back an image signal by executing the REC review function. Therefore, the user can be avoided as much as possible from mistaking the blue-backed screen 408 displayed due to a change in recording format for a blue-backed screen displayed in correspondence with the unrecorded region 404 of an image signal on the magnetic tape 709.

With the above control, the user can be prevented as much as possible from issuing a recording instruction of an image signal on an unintended recording region, and can be prevented as much as possible from overwriting a new image signal on the recorded region of an image signal by mistake.

In this embodiment, the magnetic tape 709 has been exemplified as a recording medium that records an image signal. However, the recording medium that records an image signal need not always be the magnetic tape 709. For example, any other recording media such as a flexible disk and the like may be used as long as they perform recording.

Second Embodiment

The second embodiment of the present invention will be described below. This embodiment is substantially the same as the aforementioned first embodiment, except for some processes in the method of playing back an image signal upon execution of the REC review function. Therefore, in the following description, the same reference numerals as those in FIGS. 1 to 5 denote the same parts as in the first embodiment, and a detailed description thereof will be omitted.

Figure 6:
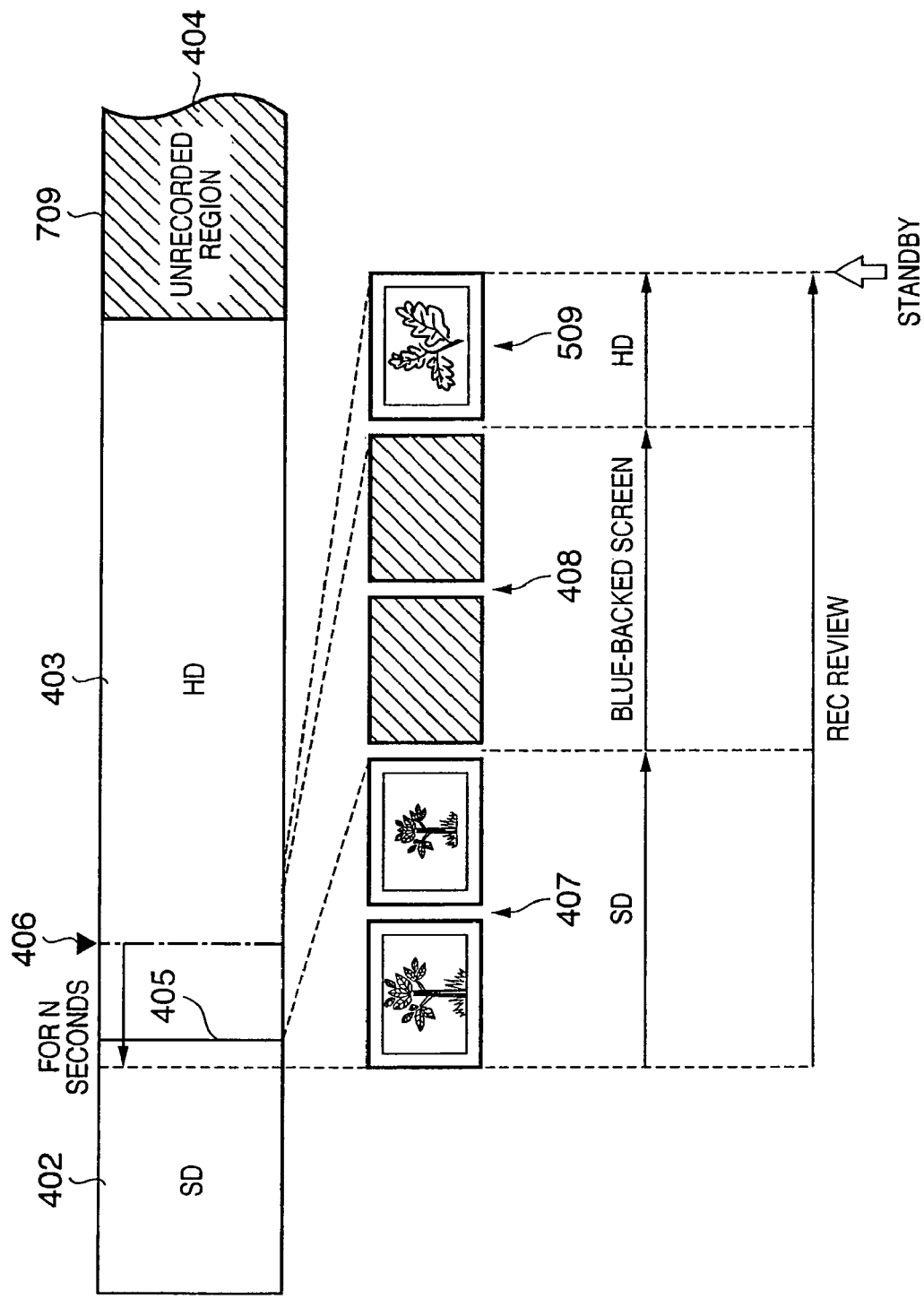
FIG. 6 is a view for explaining the REC review operation and display image of the digital video camera according to the second embodiment of the present invention.

FIG. 6 is a conceptual view showing an example of information recorded on the magnetic tape 709 and an image displayed upon execution of the REC review function.

As shown in FIG. 6, a tape stop position 406 (full inverted-triangle mark in FIG. 6) is located near a boundary 405 between a DV format region 402 and an HDV format region 403. When the REC review function is executed in this state, image signals recorded in different recording formats are played back during single execution of the REC review function.

A playback image 407 based on the image signal recorded in the DV format is displayed on the display unit 715, and the position of the magnetic tape 709 moves into the HDV format region 403 via the boundary 405 between the regions 402 and 403 of the different recording formats. After the mux/demux unit 705 detects the format of an image recorded in the HDV format, the controller 711 controls the recording/playback unit 708 to continue the playback operation of the image signal by the REC review function.

That is, after the internal processing of the digital video camera is changed from that for one format to support the other format, the controller 711 controls to continue the playback operation until the camera is ready to play back an image recorded in the other format. Then, the playback operation of the image signal by the REC review function ends when an image recorded in the other format can be played back, thus setting the standby state.

As described above, the playback operation of the image signal by the REC review function is continued until the digital video camera shifts from a playback state of an image recorded in the DV format to a state wherein it is ready to play back an image recorded in the HDV format.

Furthermore, the controller 711 executes the following processing during transition to the state the camera is ready to play back an image recorded in the HDV format by the REC review function, i.e., during switching of the internal processing of the digital video camera to support the HDV format. The controller 711 controls to display a blue-backed screen 408 on the display unit 715, and to continuously execute the REC review function. After the internal processing of the digital video camera is switched to be able to support an image recorded in the HDV format, the controller 711 enables playback of an image signal by the continuously executed REC review function. In this way, a playback image 509 based on an image signal recorded in the HDV format can be displayed on the display unit 715 by the REC review function.

With the above control, the following effect can be obtained in addition to those described in the above-mentioned first embodiment. That is, the playback time period of an image signal by the REC review function can be changed in accordance with a time period required until the camera is ready to play back an image recorded in the HDV format.

Third Embodiment

The third embodiment of the present invention will be described below. This embodiment is substantially the same as the aforementioned first and second embodiments, except for an image displayed during switching (transition period) when switching of the internal processing occurs during execution of the REC review function. Therefore, in the following description, the same reference numerals as those in FIGS. 1 to 6 denote the same parts as in the first and second embodiments, and a detailed description thereof will be omitted.

Figure 7:
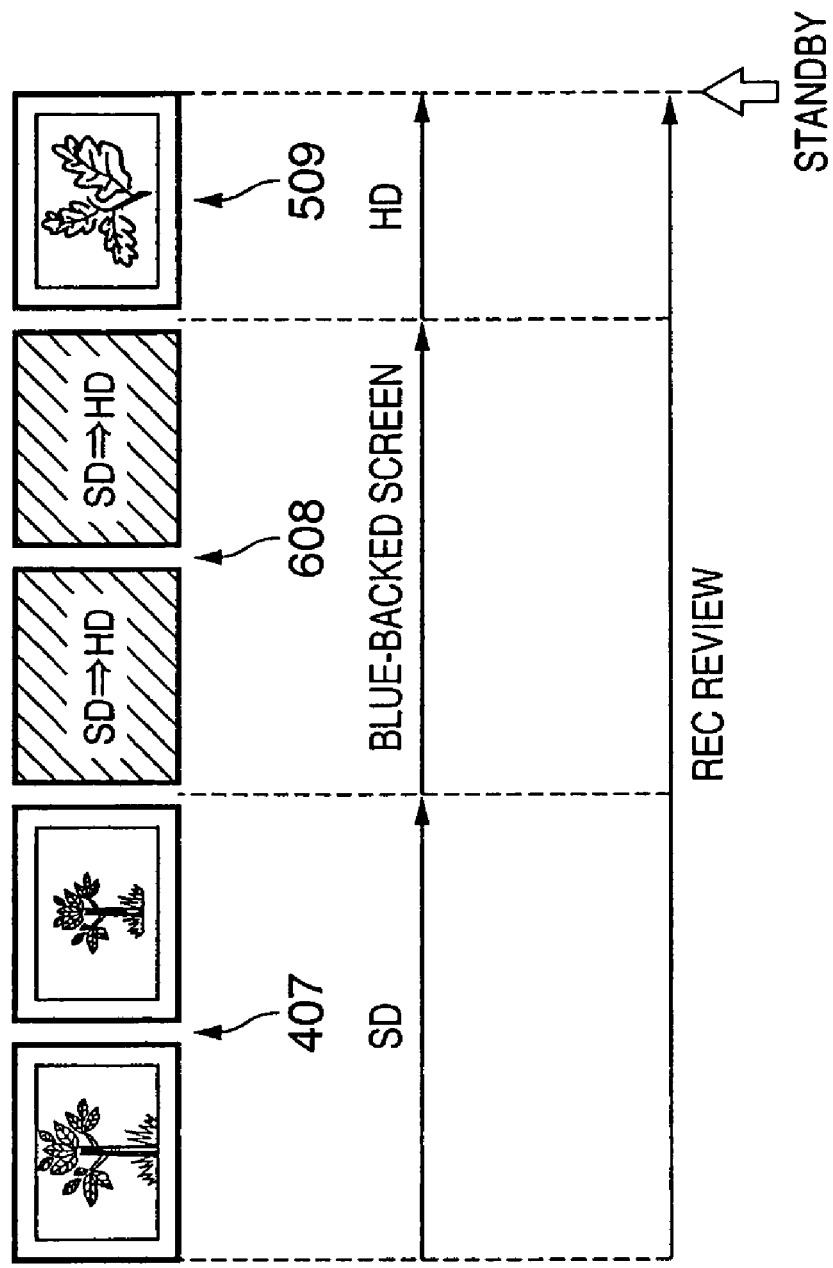
FIG. 7 is a view for explaining the REC review operation and display image of the digital video camera according to the third embodiment of the present invention.

FIG. 7 is a conceptual view showing an example of an image displayed upon execution of the REC review function.

As shown in FIG. 7, assume that the tape position moves into the HDV format region while a playback image 407 based on an image signal recorded in the DV format is displayed. As a result, the digital video camera begins to switch the internal processing to a state wherein it can display a playback image 509 based on an image signal recorded in the HDV format.

In the above embodiments, a blue-backed screen is displayed on the display unit 715 during this switching processing (transition period). By contrast, in this embodiment, an image that allows the user to recognize switching of the internal processing, e.g., a blue-backed screen 608 with text "SD⇒HD" is displayed on the display unit 715.

With this control, the user can determine at a glance whether a blue-backed screen is displayed due to the switching processing of the internal processing or due to an unrecorded part of an image signal.

Note that the contents attached to the blue-backed screen are not limited to those shown in FIG. 7. Text, a figure, or a symbol that allows the user to recognize mode transition, or a combination of them may be used. Alternatively, a different background color may be used.

Other Embodiments of the Present Invention

In the aforementioned embodiments, only the case has been explained wherein the recording format at the beginning of playback by the REC review function matches the internal processing method of the digital video camera. However, a case wherein they do not match may occur. In such case, since switching of the internal processing occurs at the beginning of playback, a blue-backed screen is displayed first. However, since the playback time period (N seconds) of the REC review function is normally longer than a time period required to switch the internal processing, the REC review function does not end with display of the blue-backed screen. Therefore, the playback time period of the REC review function need not be extended to cope with switching of the internal processing at the beginning of playback, and it need only be extended at the time of detection of a change in recording format within the REC review zone later.

Note that the blue-backed screen display described in the third embodiment can be made even during switching of the internal processing at the beginning of playback.

In the above embodiments, since the REC review zone (playback time period) is extended at the time of detection of a change in recording format within the REC review zone, the tape position upon completion of the REC review function is different from that upon reception of the execution instruction of the REC review function. For this reason, when the playback time period is extended, after playback by the REC review function ends, the magnetic tape may be rewound to the tape position upon reception of the execution instruction of the REC review function to set the standby state. Such embodiment can be easily implemented when the tape position upon reception of the execution instruction of the REC review function is stored, and the controller 711 controls the tape transport mechanism 713 to rewind the magnetic tape to the stored position.

The aforementioned embodiments can be implemented by software using a computer (or a CPU, MPU, or the like) of a system or an apparatus.

Therefore, a computer program itself supplied to the computer to implement the aforementioned embodiments by the computer also implements the present invention. That is, the computer program itself required to implement the functions of the aforementioned embodiments is one constituent element of the present invention.

Note that the form of the computer program required to implement the aforementioned embodiments is not particularly limited as long as the computer program is readable by the computer. For example, an object code, a program to be executed by an interpreter, script data to be supplied to an OS, and the like may be used, but the present invention is not limited to them.

The computer program required to implement the aforementioned embodiments is supplied to the computer via a storage medium or a wired/wireless communication. As the storage medium used to supply the program, for example, magnetic storage media such as a flexible disk, hard disk, magnetic tape, and the like, optical/magneto-optical storage media such as an MO, CD, DVD, and the like, a nonvolatile semiconductor memory, and the like may be used.

As the supply method of the computer program using the wired/wireless communication, a method utilizing a server on a computer network is available. In this case, a data file (program file) which can be the computer program that forms the present invention is stored in the server. As the program file, a file having an executable format, source codes, and the like may be used.

The program file is supplied to a client computer which accesses this server by downloading the program file. In this case, the program file may be divided into a plurality of segment files, which may be distributed and allocated in different servers.

That is, the server which provides the program file required to implement the aforementioned embodiments to the client computer is one of the present invention.

A storage medium that stores the encrypted computer program required to implement the aforementioned embodiments may be delivered to the user, and the user who has cleared a predetermined condition may be allowed to receive key information used to decrypt the encrypted program and to install the decrypted program in his or her computer. The key information can be supplied by downloading it from a homepage via, e.g., the Internet.

The computer program required to implement the aforementioned embodiments may utilize the functions of an OS which is already running on the computer.

Furthermore, some functions of the computer program required to implement the aforementioned embodiments may be configured by firmware in an expansion board or the like connected to the computer, or the computer program may be executed by a CPU of the expansion board or the like.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-212744 filed on Jul. 22, 2005, which is hereby incorporated by reference herein its entirety.

What is claimed is:

1. A playback apparatus comprising:
  playback unit adapted to play back image signals recorded in a plurality of different recording formats from a recording medium;
  recording review execution unit adapted to control, in response to issuance of a recording review instruction for an image signal recorded on the recording medium, said playback unit to rewind the recording medium from a position upon issuance of the recording review instruction by a predetermined amount and to play back the image signal from the recording medium for a period based on the predetermined amount from the rewound position; and
  detection unit adapted to detect a change in recording format of the image signal played back by said playback unit in accordance with the recording review instruction,
  wherein when said detection unit detects the change in recording format of the image signal, said recording review execution unit controls said playback unit to execute a playback operation of the image signal for a longer period than the period based on the predetermined amount.

2. The apparatus according to claim 1, wherein said recording review execution unit controls to rewind the recording medium by the predetermined amount corresponding to the image signal for N seconds, and to execute the playback operation of the image signal for (N+M) seconds when said detection unit detects the change in recording format of the image signal.

3. The apparatus according to claim 1, wherein when said detection unit detects the change in recording format of the image signal, said recording review execution unit controls said playback unit to continue the playback operation of the image signal until an image signal in the recording format after change is played back.

4. The apparatus according to claim 1, wherein said recording review execution unit controls a display device to display a message indicating that change processing of the recording format of the image signal is in progress from when said detection unit detects the change in recording format of the image signal until an image signal in the recording format after change is ready to be played back.

5. A playback method for playing back an image signal using playback unit adapted to play back image signals recorded in a plurality of different recording formats from a recording medium, comprising:
  a recording review execution step of controlling, in response to issuance of a recording review instruction for an image signal recorded on the recording medium, said playback unit to rewind the recording medium from a position upon issuance of the recording review instruction by a predetermined amount and to play back the image signal from the recording medium for a period based on the predetermined amount from the rewound position; and
  a detection step of detecting a change in recording format of the image signal played back by the playback unit in accordance with the recording review instruction,
  wherein the recording review execution step includes controlling, when the change in recording format of the image signal is detected in the detection step, said playback unit to execute a playback operation of the image signal for a longer period than the period based on the predetermined amount.

6. A non-transitory recording medium storing a computer program for making a computer execute a step of playing back an image signal using playback unit adapted to play back image signals recorded in a plurality of different recording formats from a recording medium, said program making the computer execute:
  a recording review execution step of controlling, in response to issuance of a recording review instruction for an image signal recorded on the recording medium, said playback unit to rewind the recording medium from a position upon issuance of the recording review instruction by a predetermined amount and to play back the image signal from the recording medium for a period based on the predetermined amount from the rewound position; and a detection step of detecting a change in recording format of the image signal played back by the playback unit in accordance with the recording review instruction, wherein the recording review execution step includes controlling, when the change in recording format of the image signal is detected in the detection step, said playback unit to execute a playback operation of the image signal for a longer period than the period based on the predetermined amount.

* * * * *